(12) United States Patent
Boucher et al.

(10) Patent No.: US 9,128,913 B2
(45) Date of Patent: Sep. 8, 2015

(54) METHOD AND DEVICE FOR TESTING INPUT/OUTPUT INTERFACES OF AVIONIC MODULES OF IMA TYPE

(75) Inventors: Patrice Boucher, Tournefeuille (FR); Nicolas Wacyk, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 1072 days.

(21) Appl. No.: 13/193,175

(22) Filed: Jul. 28, 2011

(65) Prior Publication Data

US 2012/0065921 A1    Mar. 15, 2012

(30) Foreign Application Priority Data

Jul. 28, 2010   (FR) ...................................... 10 56216

(51) Int. Cl.
    *G06F 19/00*    (2011.01)
    *G06F 11/22*    (2006.01)

(52) U.S. Cl.
    CPC .................................... *G06F 11/221* (2013.01)

(58) Field of Classification Search
    USPC ........................................................ 702/123
    See application file for complete search history.

(56) References Cited

U.S. PATENT DOCUMENTS

2010/0312420 A1 * 12/2010 Sham et al. ....................... 701/3

OTHER PUBLICATIONS

French Preliminary Search Report issued on Feb. 18, 2011 in corresponding French Application No. 10 56216 filed on Jul. 28, 2010 (with an English Translation of Categories).
Christopher B. Watkins et al., "Modular Verification: Testing a Subset of Integrated Modular Avionics in Isolation", IEEE 25th Digital Avionics Systems Conference, Oct. 1, 2006, XP 031048509, pp. 6E1-1-6E1-12.

* cited by examiner

*Primary Examiner* — Tung S Lau
(74) *Attorney, Agent, or Firm* — Oblon, McClelland, Maier & Neustadt, L.L.P.

(57) ABSTRACT

Input/output interfaces of avionic modules of IMA type in a device including several modules is tested. A system includes at least one application employed by a set of computer modules. This set includes the computer module (a first module), and at least one other computer module (at least one second module). A system test is associated with the at least one system for functionally testing the set of computer modules according to the system. The system test includes at least one elementary system test for functionally testing at least one input/output interface of the first module. The execution of the at least one elementary system test is independent of the at least one second module. At least one result of execution of the at least one elementary system test is transmitted to a maintenance computer distinct from the computer modules of the plurality of computer modules.

13 Claims, 6 Drawing Sheets

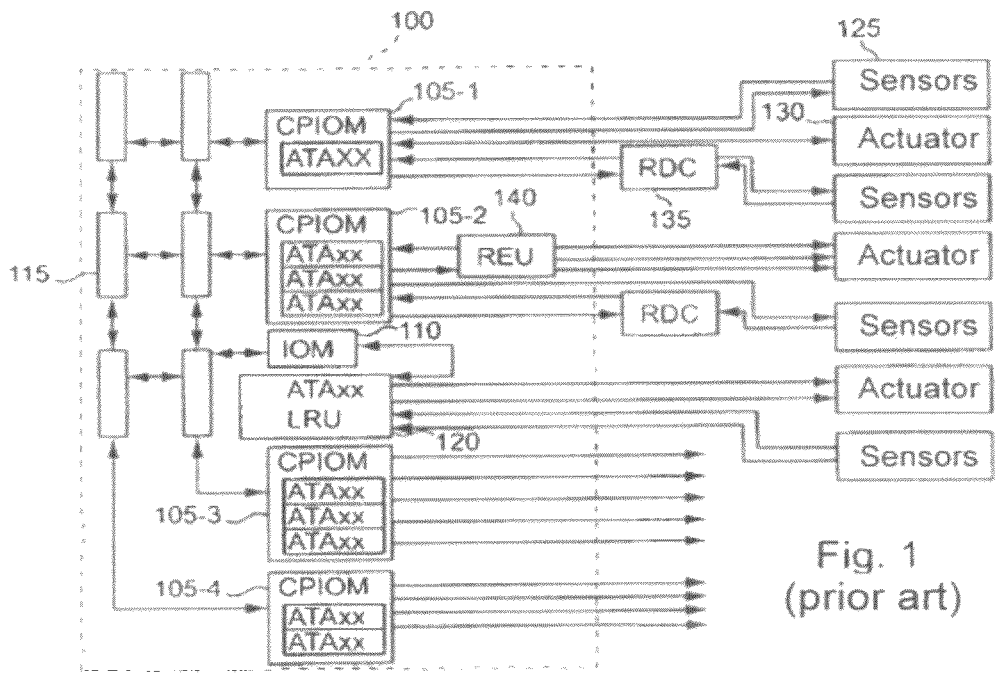
Fig. 1
(prior art)
Fig. 2
(prior art)
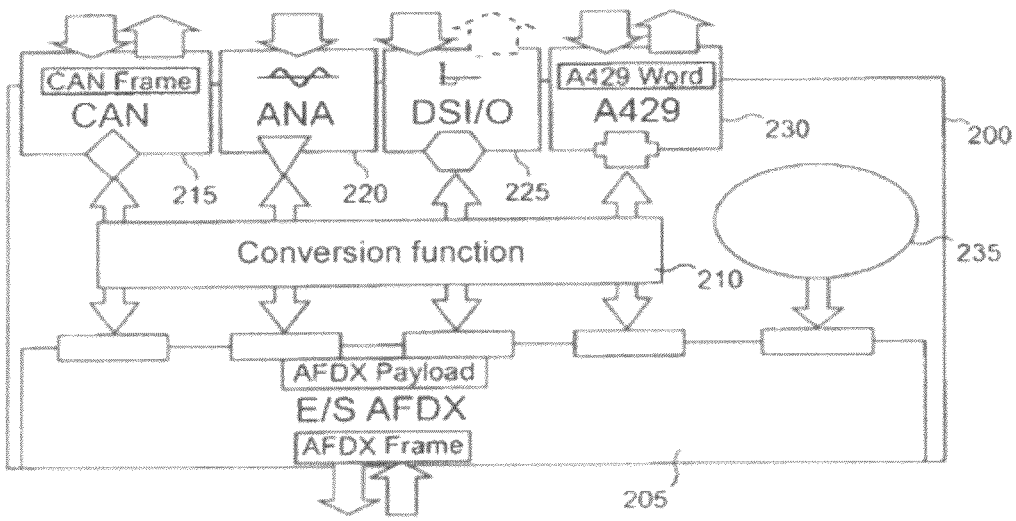

METHOD AND DEVICE FOR TESTING INPUT/OUTPUT INTERFACES OF AVIONIC MODULES OF IMA TYPE

The present invention relates to the maintenance of electronic modules and more particularly to a method and device for testing input/output interfaces of avionic modules of IMA type, especially during their replacement.

The avionic systems such as the fuel management and landing systems of past-generation aircraft used their own computers, peripherals, cabling, input/output interfaces, sensors and actuators. In contrast, the new-generation aircraft use what is known as IMA architecture (initials for Integrated Modular Avionic in English terminology), according to which the hardware and software parts have been distinguished, permitting several avionic systems to share the same hardware elements. This evolution has made it possible to reduce the number of separate hardware elements in an aircraft and consequently the development and qualification costs.

For these purposes, new equipment items have been developed in the form of modules, especially the CPIOMs (initials for Core Processing Input Output Module in English terminology) and the IOMs (initials for Input Output Module in English terminology). The IOMs comprise substantially input/output interfaces while the CPIOMs additionally comprise processing capacities, or in other words capacities for executing software components. Such an architecture supports the execution of applications of several independent systems.

The IMA modules also furnish services for the hosted applications, such as nonvolatile data management, downloading and updating of software applications, test functions referred to as BITE (acronym for Built-In Test Equipment in English terminology), input/output interface routing and input/output conversion.

FIG. 1 illustrates an example of architecture of IMA type and of closely related equipment items employed in a modern avionic solution. Avionics 100 is based in this case on four CPIOM modules 105-1 to 105-4 and one IOM module 110. These modules are interconnected by communication links of AFDX type (initials for Avionic Full-DupleX ethernet switched in English terminology) via switches denoted generically by 115.

Each CPIOM module makes it possible to employ applications of one or more avionic systems capable of being identified by its ATA reference (the ATA, the initials for Air Transport Association, is an international standardization organization that has established a classification based on ATA chapters and used to identify functional parts of an aircraft in standardized manner). In the present case, avionics 100 additionally comprises a specialized module 120 of LRU type (initials for Line Replaceable Unit in English terminology).

By way of illustration, modules 105-1, 105-2 and 120 are connected to sensors denoted generically by 125 and to actuators denoted generically by 130. The communication links between the IMA modules and the sensors and actuators are, for example, discrete, analog or CAN-type links (initials for Controller Area Network in English terminology). Concentrators denoted generically by 135, also referred to as RDCs (initials for Remote Data Concentrator in English terminology) may be used to connect IMA modules and sensors. Similarly, controlled electronic units denoted generically by 140, also referred to as REUs (initials for Remote Electronic Unit in English terminology) may be used to connect IMA modules and actuators. The communication links between IMA modules and units of RDC and/or REU type may be in conformity with the ARINC 429 standard (ARINC is a trademark).

Typically, the IOMs are IMA resources in charge of the conversions necessary for data exchanges between applications that use a network of AFDX type and other equipment items that are not compatible with this standard, such as equipment items using the ARINC 429 standard, sensors and/or actuators. FIG. 2 illustrates an example of architecture of an IOM. The IOMs generally do not host a functional software component but are capable only of performing conversions.

As represented, IOM 200 comprises an AFDX input/output interface 205, a conversion function 210 and specific input/output interfaces, for example an input/output interface 215 of CAN type, an input/output interface 220 of analog type, an input/output interface 225 of discrete type and an input/output interface 230 of ARINC 429 type. IOM 200 may additionally comprise a control function 235 capable of integrating a BITE function.

FIG. 3 illustrates a CPIOM 300 that in this case comprises a calculation card 305 connected to an AFDX communication card 310, a power-supply and input/output interface card 315 and two input/output interface cards 315-1 and 315-2. In this case these cards are connected to one another by a PCI interface 325 (initials for Peripheral Component Interconnect in English terminology). This module may exchange data with external modules and/or equipment items via interface 330, which in this case comprises an AFDX interface, an interface in conformity with the ARINC 429 standard, an analog interface, a discrete interface and an interface of CAN type. CPIOM 300 additionally comprises a BITE function 335.

It is noted here that, while the BITE function makes it possible to conduct tests of the module itself, it also makes it possible to test a system being employed at least partly by this module. The BITE functionality is generally achieved by hardware and software components of the modules.

Depending on their nature, the input/output interfaces of a module are typically driven by software components hosted on the module itself, especially as regards the CPIOMs, or on another computer, in particular as regards the IOMs. Each module generally has a set of interactive tests pertaining separately to the module and to its interface, permitting a maintenance operator to check the module during a maintenance operation by means of a BITE function, which makes it possible to test an equipment item when it is in operation.

The possible failures and the process for detecting them are distributed both at the application level and on the platform that hosts the applications. Thus, by way of illustration, the BITE function may be divided into subfunctions, especially system (BITE system or SB), application (BITE application or AB) and resources (BITE resource, RB or RBITE).

Concerning the RB, the monitoring activity is typically performed by functions executed continuously by the operating system used by the module and its controllers (referred to as drivers in English terminology). When a failure is detected, the RB is alerted. It then filters the detected failure and, as the case may be, transmits a message to a central computer for management of maintenance messages, referred to as CMS (initials for Centralized Maintenance System in English terminology). There is generally one RB per module.

The AB and the SB process the functional and operational consequences of detected failures or breakdowns. The AB is in charge of monitoring functional and operational parts of partitions, a partition of one or more modules being typically allocated to one avionic system. Each partition has one AB that reports to the SB. The SB makes it possible to recover the information items originating from the different ABs of the same system and, as the case may be, to transmit them to the CMS. Tests of the system (system test) and tests of applications (application test) are associated with the SB and AB respectively.

In many cases, these functionalities are under the responsibility not of the resource (ATA 42) but of avionic applications (ATA XX) hosted by the resource. Consequently, the maintenance operators are not the same, and a maintenance operator of a given ATA cannot intervene in another ATA.

The RB generally comprises, in particular, an interactive mode that permits a maintenance operator to carry out tests when the aircraft is on the ground. In this mode, a maintenance operator (ATA 42) is able to carry out a test on a module (module test) to verify that it is functioning properly, in particular the digital buses connected to the computer. The objective of this test is to verify the hardware integrity of the module, or in other words to detect the internal errors.

This mode also permits an operator to carry out logical tests of interfaces of the module (module interface test) in order to check input/output interfaces designed to be tested by virtue, for example, of a reaction mechanism (commonly referred to as feedback mechanism). For safety reasons, however, numerous input/output interfaces cannot be tested (certain input/output interfaces cannot be activated or deactivated without risk for the aircraft or ground personnel, for example fuel valves or engine controls), or because they are not provided with a reaction mechanism. In fact, the ATA 42 resource, or in other words the computer resource being used by the other avionic systems and applications (ATA XX) must not emit stimuli over input/output interfaces when it does not know the equipment items to which they are interfaced. If an operator wishes to make sure that all the input/output interfaces are functioning properly, he must carry out the tests on systems (system tests) pertaining to the avionic applications in question (ATA XX). Such tests must be performed by trained maintenance operators (in general different from ATA 42 operators).

It is noted here that, for each system application hosted by an IMA module, there potentially exists a set of critical input/output interfaces, whose non-availability may have consequences for the operating safety of the aircraft. For example, during a maintenance operation pertaining to replacing an IMA module in an aircraft, a pin of one of the connectors of this may break, and this pin may be part of the list of input/output interfaces judged critical by one of the system applications hosted by the module but not necessarily by the system application that was the cause of the failure leading to replacement of the equipment item.

As described in the foregoing, the interactive tests of a module, executed by an installation procedure while it is being set up, do not cover all of its input/output interfaces. It is therefore possible that the replaced module will be considered as being operational despite a broken pin.

Thus, when a module is replaced following detection of a failure, the tests carried out via the interface of the RB should be supplemented by system tests performed at the system applications in order to verify all of the input/output interfaces. These system tests are tests designed for and by the avionic applications that use the module (ATA 42) in order to test the system in its entirety. However, the time for execution of system tests is generally several minutes. Thus, for reasons of respect for availability of the aircraft, only the system test associated with the source of the failure is generally executed. In many cases, therefore, other interfaces used by other systems using the replaced IMA module are not verified, because it is generally not possible to carry out all of the system tests of all of the avionic systems that are using the replaced module (this would necessitate several hours, and in many cases only a limited time referred to as TAT, the acronym for Turn Around Time in English terminology, is available to maintenance in order to carry out replacement of an element).

The invention makes it possible to solve at least one of the problems outlined in the foregoing.

An object of the invention is therefore a method for testing at least one input/output interface of a computer module of IMA type comprising a plurality of input/output interfaces in a device comprising a plurality of computer modules of IMA type, at least one system comprising at least one application being employed by a set of computer modules of the said plurality of computer modules, the said set comprising the said computer module, referred to as first module, and at least one other computer module, referred to as at least one second module, at least one system test being associated with the said at least one system for functionally testing the said set of computer modules according to the said system, the said at least one system test comprising at least one elementary system test for functionally testing the said at least one input/output interface of the said first module, the method comprising a step of executing the said at least one elementary system test, the said step of executing the said at least one elementary system test being independent of the said at least one second module, and a step of transmitting at least one result of execution of the said at least one elementary system test to a maintenance computer distinct from the computer modules of the said plurality of computer modules.

The method according to the invention therefore makes it possible to test an input/output interface of a module according to a system being partly employed by this module, without testing the other modules being used by this system, in order to target the tests and consequently to limit the time necessary for execution of tests related to systems hosted by sets of modules. A particularly advantageous application of the invention pertains to testing a computer in an aircraft following the change of this computer, to limit its installation time. In this way the method according to the invention contributes to shortening the immobilization time of an aircraft on the ground as well as to simplifying the tasks of maintenance operators.

According to a particular embodiment, the method additionally comprises a step of executing at least one second elementary system test distinct from the said at least one elementary system test, referred to as first elementary system test, the said at least one second elementary system test making it possible to test at least one second input/output interface of the said first module, distinct from the said at least one input/output interface, referred to as at least one first interface, the said at least one second elementary system test belonging to a second system test distinct from the said at least one system test, referred to as at least one first system test, the said second system test being associated with a second system comprising at least one application, distinct from the said at least one system, referred to as at least one first system, the said second system being employed by a second set of computer modules, distinct from the said set of computer modules, referred to as first set, comprising at least the said first module and at least one other computer module of the said plurality of computer modules, the said second system test making it possible to test the said second set of computer modules functionally according to the said second system, the said step of executing the said at least one second elementary system test being independent of the said at least one other computer module of the said second set, and a step of transmitting at least one result of execution of the said second elementary system test to the said maintenance computer.

In this way the method according to the invention makes it possible to test the integrity of a module according to the systems hosted by this module, without testing these systems in themselves, or in other words without testing the parts of these systems hosted by other modules.

Advantageously, the said step of executing the said at least one second elementary system test is called after the execution of the said first elementary system test. In this way it is possible to concatenate a set of elementary system tests in order automatically to test a module hosting several parts of different systems.

Preferably, the method additionally comprises a step of logical interface testing of at least one input/output interface of the said computer module, the said step of executing the said at least one elementary system test being called by the said logical test step. In this way it is possible, for testing of input/output interfaces of modules, to combine commonly employed logical tests with elementary system tests according to the invention in order to increase the scope of testing of the tested modules.

Advantageously, the method preferably additionally comprises a step of authorizing execution of the said elementary system test according to the said at least one system, the said elementary system test being executed in response to the said authorization step. In this way it is verified that an elementary system test may be carried out in conformity with the conditions related to the associated system.

The said elementary system test is preferably executed in an environment specific to the said at least one system in order that the said elementary system test is executed in an environment as close as possible to that in which the system applications are executed.

According to a particular embodiment, the method additionally comprises a step of initializing the said elementary system test, the said initialization step being executed in response to an operator command acquired via the said maintenance computer. Such an initialization step makes it possible, for example, to place the tested module in interactive mode.

According to yet another particular embodiment, the method additionally comprises a step of verifying at least one initial condition, the said step of executing the said at least one elementary system test being executed in response to the said step of verifying at least one initial condition. In this way it is possible to verify that conditions are verified before launching elementary system tests. In this way the method according to the invention may be employed without danger for the aircraft and the persons situated in its interior or in proximity thereto.

Advantageously, the method additionally comprises a preliminary step of breaking the said system test down into a plurality of elementary tests, the said plurality of elementary tests comprising the said at least one elementary system test. In this way, since the elementary system tests are derived from system tests, their development is limited.

Another object of the invention is a computer program comprising instructions adapted to the employment of each of the steps of the method described in the foregoing when the said program is executed on a computer, a device comprising means adapted to employment of each of the steps of the method described in the foregoing as well as an aircraft comprising this device.

The advantages obtained by this computer program, this device and this aircraft are similar to those alluded to in the foregoing.

Other advantages, objectives and characteristics of the present invention become apparent from the detailed description hereinafter, provided by way of non-limitative example, with regard to the attached drawings, wherein:

FIG. 1 illustrates an example of architecture of IMA type and of closely related equipment items employed in a modern avionic solution;

FIGS. 2 and 3 illustrate an example of architecture of an IOM and of a CPIOM respectively;

Figure 4A:
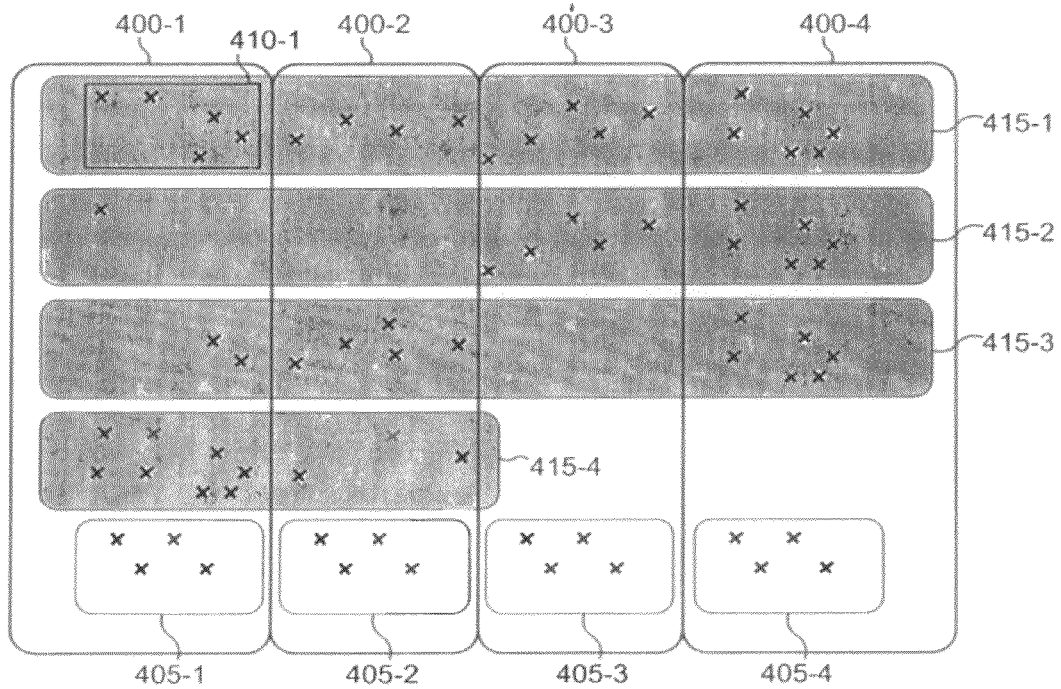
Figure 4B:
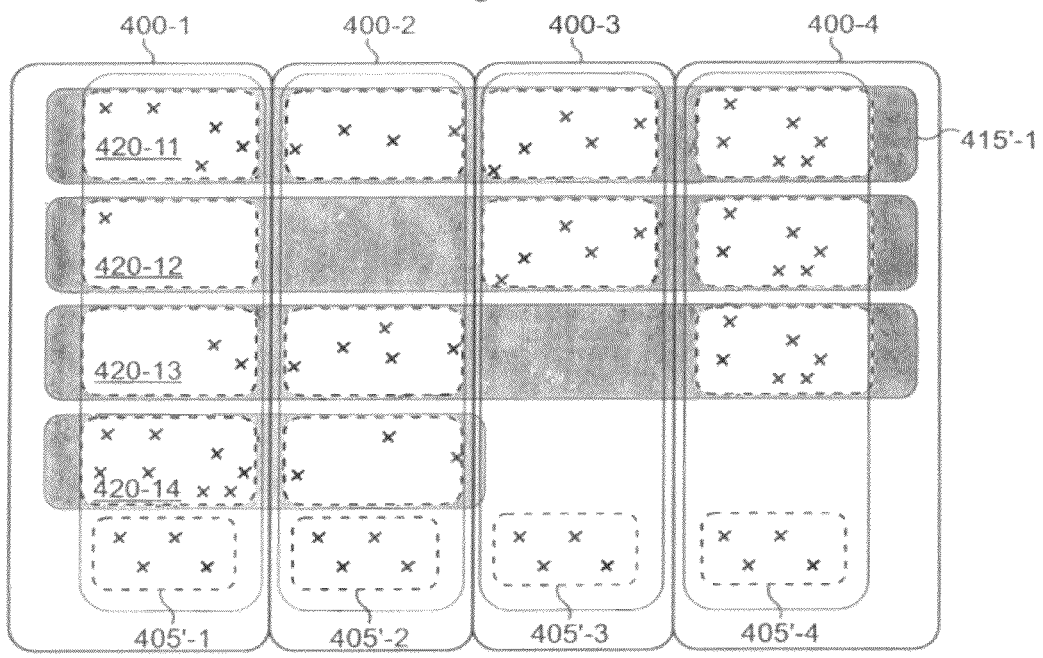
Figure 10:
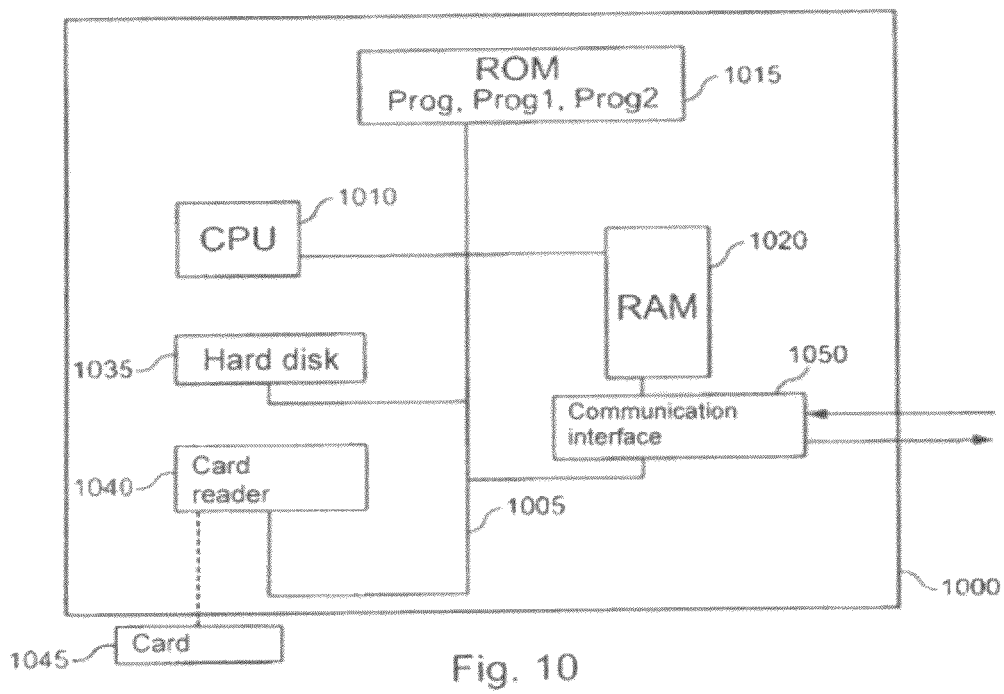
Figure 8:
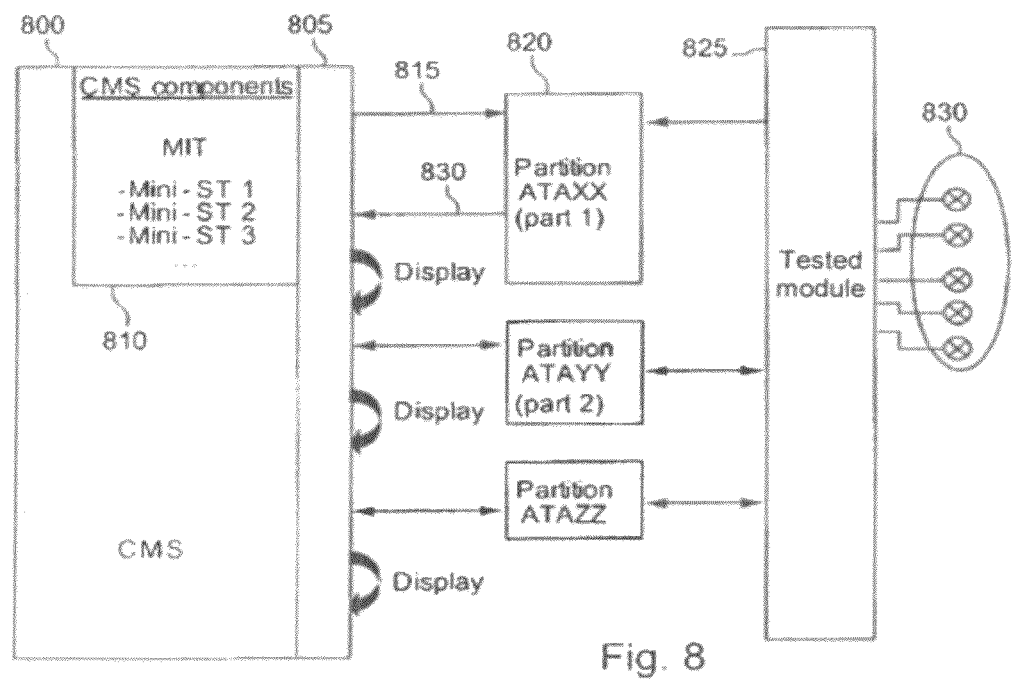
Figure 9:
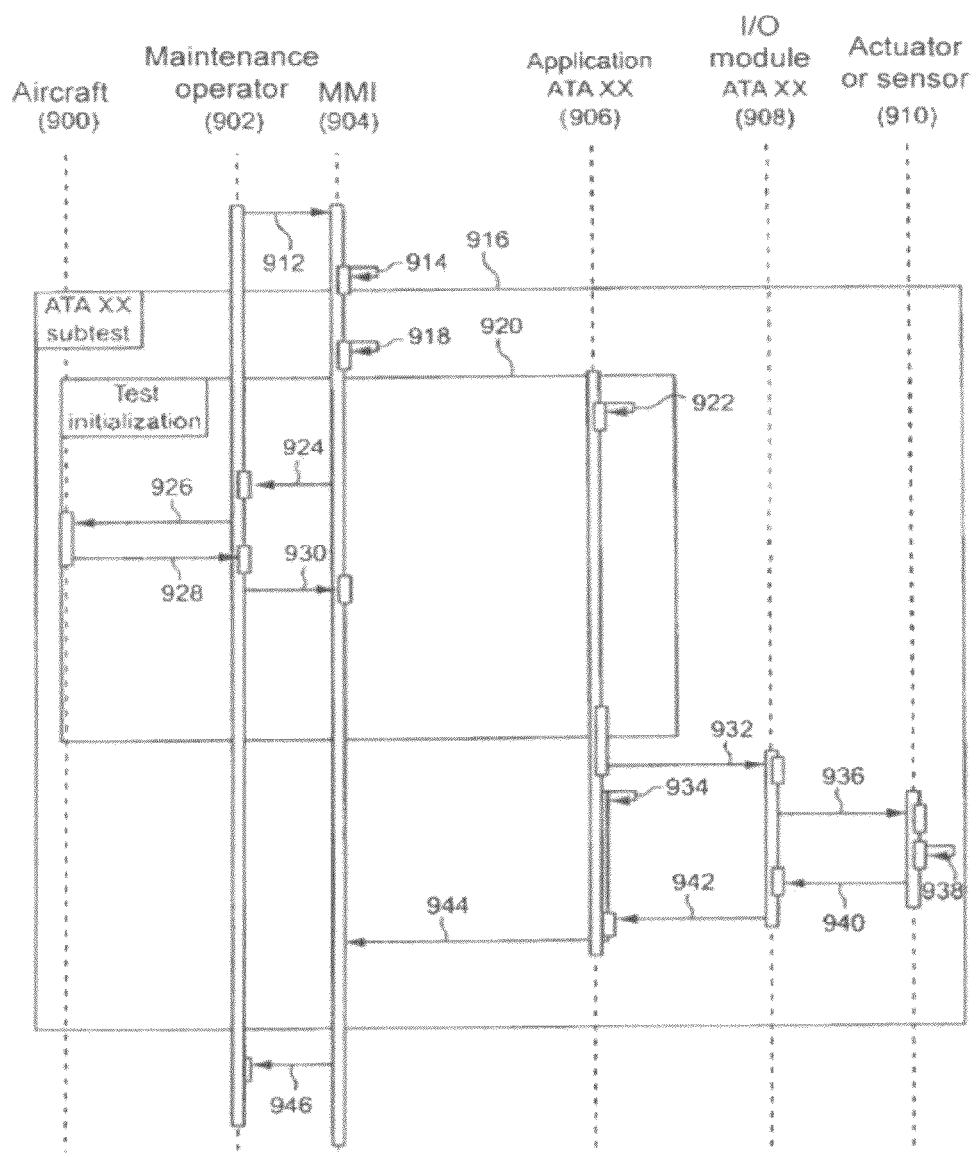

FIG. 4, comprising FIGS. 4a and 4b, illustrates the scope of coverage of input/output interface tests in four modules employing four avionic systems when a module interface test and system tests are being executed and when a module interface test and elementary system tests are being executed respectively;

FIGS. 5 to 8 illustrate four embodiments of input/output interface tests of a module of IMA type according to the invention;

FIG. 9 illustrates an example of a diagram of the sequence during execution of an elementary system test necessitating verification of initial conditions, in conformity with the fourth embodiment described with reference to FIG. 8; and FIG. 10 illustrates an example of hardware architecture adapted to employment of certain steps of the invention.

The invention applies to testing a module of IMA type comprising input/output interfaces used by several applications, certain input/output interfaces being considered as critical with respect to the operating safety of the device comprising this module, typically an aircraft, in particular after the module has been replaced.

For these purposes, the module employs system tests whose execution is limited in time while respecting constraints of safety of avionic systems, comprising one or more applications, hosted at least partly by a module. More precisely, during the procedure of installation of the module, the invention pertains to stimulating only the input/output interfaces of avionic systems hosted by the module, which are not covered by interactive tests, without stimulating the inputs/outputs of other modules used by these same avionic systems. It is also possible, to shorten the maintenance time, to test only the critical inputs/outputs of the module.

In this way the invention permits a maintenance operator in charge of carrying out procedures of installation and removal of a module to have only one interactive test to execute, this test covering the hardware part of the module as well as its input/output interfaces judged to be critical.

In general, the invention consists in adding, to the scope of integrity tests of a module, or in other words to the module test verifying the internal faults of the computer and module interface test verifying the testable input/output interfaces, a set of supplementary tests making it possible to ensure, during execution of the integrity test of the module, complete coverage of safety aspects. These supplementary tests represent a subset of the scope of tests carried out by system tests of hosted avionic applications. These tests correspond solely to the input/output interfaces used by the applications on the tested module or only to those judged to be critical by the system designer and not covered by the interactive tests of the module.

In this way, new types of tests are defined for testing input/output interfaces that can be tested only by means of system applications. Such tests may be carried out in shorter times and with fewer constraints than the standard system tests. They are preferably developed with the aid of system engineers for the ATAs in question (ATA XX), using the ATA 42 resource. However, so as not to hamper the process of development of applications, specific development relating to these new types of tests is preferably not envisioned.

An advantageous solution then consists in using existing system tests developed with the avionic applications in question, for testing their own input/output interfaces. In this case these existing system tests are broken down into elementary tests, for example by module, by criticality level and/or by input/output interface, to permit their integration with integrity tests performed at the ATA 42 level within a module.

These new types of tests, which may be referred to as mini system tests (mini ST) or elementary system tests, make it possible to test a limited number of input/output interfaces according to the characteristics of the applications. Advantageously, the system tests are broken down into as many elementary system tests as there are modules on which the application under consideration is hosted and into as many criticality levels as are defined by the developers of the corresponding application.

These elementary system tests may be integrated with the module test interface or may be called autonomously by a maintenance operator via this interface. Regardless of the chosen implementation, for these elementary system tests to be executed they must satisfy the same constraints as the module test and the module interface test, in other words, in particular, they must be capable of being executed by a maintenance operator from a central computer for management of maintenance messages (CMS), when the aircraft is on the ground.

By being interfaced with the existing procedures for creating system tests, by adding a step consisting in breaking these tests down by criticality and/or by module, for example, the additional cost to develop these elementary system tests is slight. From the ATA 42 viewpoint, it is necessary to take these new types of tests into account in order to employ them. To satisfy the constraints of cost and safety as well as those related to the procedures pertaining to ATA 42 and the applications in question, several solutions are possible.

FIG. 4, comprising FIGS. 4*a* and 4*b*, illustrates the scope of coverage of input/output interface tests in four modules denoted 400-1 to 400-4 employing four avionic systems, each comprising one or more applications, when a module interface test and system tests are being executed and when a module interface test and elementary system tests are being executed respectively. In this case, each cross represents an input/output interface.

Module 400-1 comprises a set of input/out interfaces, some of which may be tested by the associated module interface test and others may be tested by system tests or elementary system tests.

Thus, as illustrated in FIG. 4*a*, reference 405-1 denotes the coverage of testing of input/output interfaces of module 400-1 by the associated module interface test. Reference 410-1 pertains to the coverage of testing of input/output interfaces of module 400-1 by system tests of a first avionic system employed by modules 400-1 to 400-4. However, as described in the foregoing, input/output interfaces 400-1 cannot be tested by system tests independently of the input/output interfaces of modules 400-2 to 400-4 used by this first avionic system. Thus, when the system tests of the first avionic system are executed, the coverage of testing of the input/output interfaces comprises input/output interfaces of modules 400-1, 400-2, 400-3 and 400-4, as illustrated by reference 415-1.

Similarly, the coverage of testing of the input/output interfaces of modules 400-2, 400-3 and 400-4 by the module interface tests associated with them is represented by references 405-2, 405-3 and 405-4 respectively. Similarly, the coverage of testing, by associated system tests, of the input/output interfaces used by a second, a third and a fourth avionic system employed by modules 400-1 to 400-4, is represented by references 415-2, 415-3 and 415-4 respectively.

Thus, as illustrated, a large number of input/output interfaces is not tested by the module interface tests, whereas the use of system tests makes it possible to test all of the input/output interfaces. However, as described in the foregoing, the execution of system tests requires considerable time and generally necessitates the intervention of specialized maintenance operators, for example in order to actuate valves or to carry out verifications. In addition, such tests have the objective of testing input/output interfaces of all of the modules employing the corresponding avionic system, without the possibility of testing a single module. Knowing that an avionic system may be employed by more than four modules and that one module may host numerous avionic systems, the time for testing the input/output interfaces of a module increases commensurately.

The breakdown of system tests into elementary tests comprising elementary system tests makes it possible to test the input/output interfaces associated with an avionic system of a single module, as illustrated in FIG. 4*b*.

Reference 405'-1 denotes the coverage of testing of input/output interfaces of module 400-1 by the module interface test. Reference 420-11 pertains to the coverage of testing of input/output interfaces of module 400-1 by elementary system tests of a first avionic system employed by modules 400-1 to 400-4. These elementary system tests, derived from system tests 415'-1, are in this case associated with module 400-1. Consequently, the coverage of tests of input/output interfaces by these elementary system tests is limited to module 400-1, even when the corresponding avionic system is being employed by modules 400-1 to 400-4.

Similarly, references 420-12, 420-13 and 420-14 illustrate the coverage of tests of input/output interfaces of module 400-1 by elementary system tests of second, third and fourth avionic systems employed by modules 400-1 to 400-4.

The input/output interfaces referred to by references 420-11 to 420-14 are tested when the module interface test of module 400-1 is executed or by a maintenance operator via this test interface. Thus the coverage of testing of input/output interfaces of module 400-1 by the module interface test, directly or indirectly, comprises all of the input/output interfaces denoted by 405'-1 and 420-11 to 420-12, or in other words all of the input/output interfaces denoted by 425-1, that is, according to this example, all of the input/output interfaces of module 400-1.

It is noted here that all of the input/output interfaces of module 400-1 are tested without necessitating testing of input/output interfaces of modules 400-2, 400-3 and/or 400-4.

Several possible embodiments exist for employing elementary system tests. However, regardless of the embodiment envisioned, it is advantageous to avoid making the work of development of avionic systems complex. Consequently, the creation of files with which elementary system tests can be configured is preferably achieved on the basis of system test configuration files, for example XML files (initials for eXtensible Markup Language in English terminology).

According to a first embodiment, the module interface test, in the course of its execution, requests from the avionic systems in question (ATA XX) the result of elementary system tests associated with them. In this way the ATA XXs themselves carry out these elementary system tests. The results are then added by the module test to the results of input/output interface tests carried out by the module interface test.

In other words, when a module interface test is called, the module on which it is executed requests, from all of the avionic systems for which this module furnishes input/output interfaces, the results of elementary system tests associated with these input/output interfaces. To be able to furnish them, each avionic system carries out, upon request of the module, the test of its input/output interfaces by virtue of a database of preconfigured elementary system tests (in other words, sub-tests of system tests). At the end of execution of the module interface test, the tested module concatenates the results originating from different elementary system tests of different avionic systems being employed with those of the module interface test. The concatenated results are then transmitted to the CMS or to an equivalent device.

Figure 3:
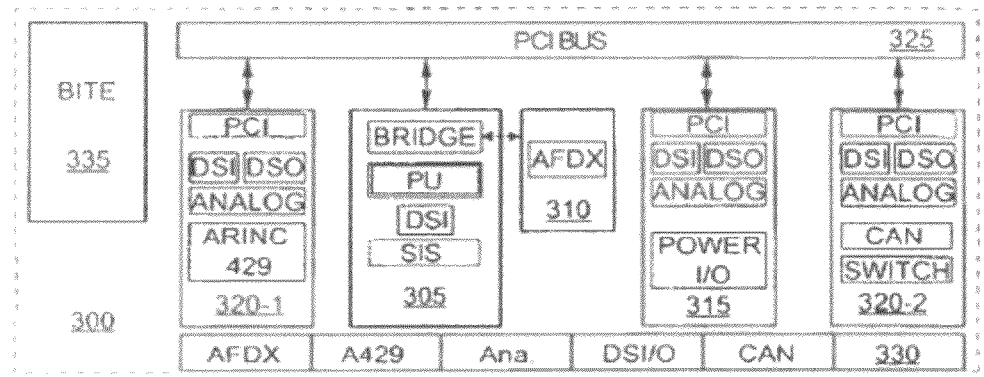
Figure 5:
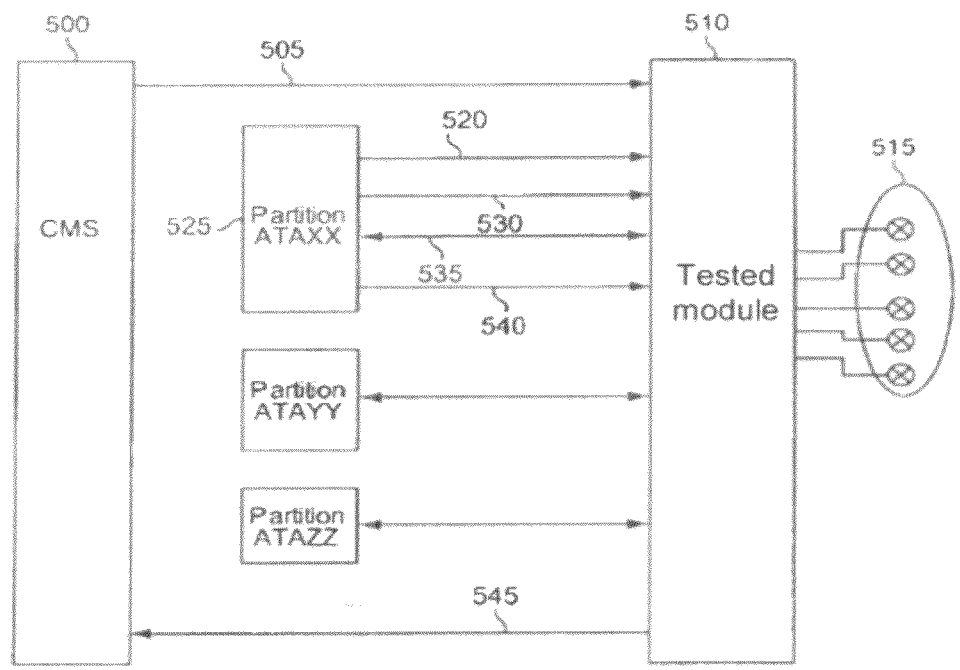

Such an embodiment is described with reference to FIG. 5.

When an aircraft is on the ground, a maintenance operator may launch a module interface test (MIT) from a maintenance computer, for example the CMS 500 placed in interactive mode, via a man-machine interface (MMI) of this computer (step 505). The corresponding request is transmitted to module 510 to be tested. On the basis of a configuration file, module 510 determines the input/output interfaces being used by each partition, or in other words the input/output interfaces allocated to each avionic system, among all of the input/output interfaces 515 of the module.

Module 510 then sends a request, for example sequentially, to each partition for execution of elementary system tests that make it possible to test the corresponding input/output interfaces. Thus module 510 begins by sending a first request (step 520) to the partition associated with a first avionic system, in this case ATA XX, denoted by 525, indicating preferably the input/output interfaces to be tested.

It is noted that, although certain input/output interfaces must not or cannot be tested, especially for safety reasons, depending on the state of the aircraft, it is sufficient that the corresponding elementary system test take this datum into consideration (the designers of the avionic system who write the elementary system tests are best positioned to know the testability or otherwise of an input/output interface) and forewarn the tested module that this input/output interface is not testable.

In response to the request for execution of elementary system tests, if input/output interfaces of first partition 525 can be tested, this partition returns an authorizing acknowledgment of receipt confirming the possibility of executing the input/output interface test (step 530), or in other words a message of the OK type. Alternatively, if the inputs/outputs of first partition 525 cannot be tested, the returned message is of the NOK type. The first partition may also authorize the test of only certain input/output interfaces. The transmitted library may then comprise only the authorized system tests or may comprise all of the elementary system tests, with the proviso that the tested module execute only those authorized.

If input/output interfaces of first partition 525 can be tested, first partition 525 finds the elementary system test or tests and executes them. As indicated in the foregoing, these elementary system tests are typically sub-tests of traditional system tests. For these purposes, data may be exchanged between tested module 510 and first partition 525 (step 535), especially in order to furnish results of elementary system tests when all of the elementary system tests associated with first partition 525 have not been executed.

After the authorized elementary system test or tests of the first partition have been executed, the corresponding results are transmitted to tested module 510 (step 540), which adds them to the results of the module interface test. As indicated hereinabove, these results may also be transmitted gradually as the elementary system tests are being executed.

The process is then repeated for the next partitions, especially, in this case, the partitions linked in this case to the systems ATA YY and ATA ZZ.

After it has launched execution of elementary system tests associated with the partitions of the tested module, the module interface test transmits, to the CMS (step 545), its test results, additionally comprising the test results obtained from the partitions, in other words the results of executed elementary system tests.

This embodiment makes it possible to obtain a complete test result and to segregate the executed tasks, the tested module executing the module interface test (ATA 42) and each ATA being in charge of executing the elementary system tests. Furthermore, the resources used to execute the tests, especially the CPU resources (initials for Central Processing Unit in English terminology) are those of the partition ATA XX whose inputs/outputs are being tested. It is therefore not necessary to provide particular resources in the module being tested.

According to a second embodiment, the elementary system tests are created by the developers of avionic applications in the form of libraries. These libraries are then called by the module being tested in addition to the module test and the module interface test. This embodiment is therefore close to the first embodiment described in the foregoing, but the module test requests, from the systems ATA XX, the libraries of the elementary system tests that it executes itself to supplement its module interface test.

Figure 6:
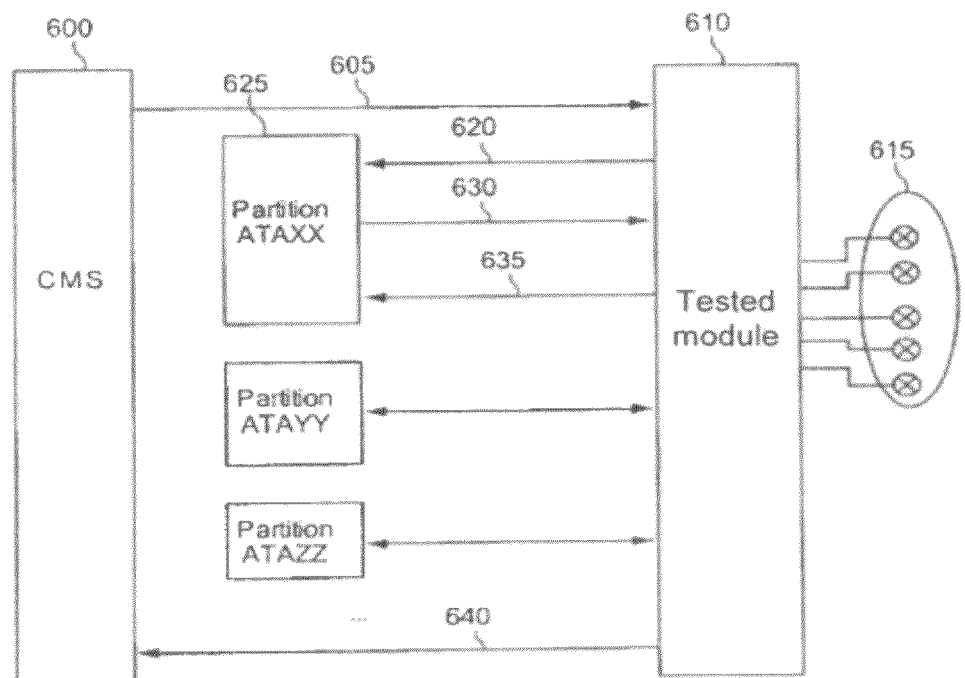

This embodiment is illustrated in FIG. 6.

Once again, when an aircraft is on the ground, a maintenance operator may launch a module test from a maintenance computer such as CMS 600 placed in interactive mode, via an MMI of this computer (step 605). The corresponding request is transmitted to module 610 to be tested. On the basis of a configuration table, module 610 determines the input/output interfaces used by each partition, or in other words the input/output interfaces allocated to each avionic system, among all of the input/output interfaces 615 of the module.

Module 610 then sends a request, for example sequentially, to each partition to obtain authorization to test the associated input/output interfaces and to obtain a library corresponding to the elementary system tests that make it possible to test these input/output interfaces. Thus module 610 begins by sending a first request (step 620) to the partition associated with a first system, in this case ATA XX, denoted by 625, indicating preferably the input/output interfaces to be tested.

In response to this request, the partition returns a message authorizing the input/output interface test (step 630), or in other words a message of the OK type, as well as the library corresponding to the elementary system tests to be executed. Alternatively, if the input/output interfaces of first partition 625 cannot be tested, the returned message is of the NOK type.

If input/output interfaces of first partition 625 can be tested and the module being tested has received a library corresponding to the elementary system tests to be executed, this library is executed by the module being tested. As indicated in the foregoing, these elementary system tests are typically sub-tests of traditional system tests.

After the elementary system tests of the first partition have been executed, the corresponding results are added to the results of the module interface test. A message indicating end of execution of the received library is then preferably transmitted to first partition 625 (step 635).

The process is then repeated for the next partitions, especially the partitions linked to the systems ATA YY and ATA ZZ.

After it has launched execution of libraries corresponding to the elementary system tests associated with the partitions of the tested module, the module interface test transmits, to the CMS (step 640), its test results, comprising the test results obtained from the partitions, in other words of the elementary system tests.

This embodiment makes it possible to obtain a complete test result and to segregate the executed tasks, the tested module executing the module interface test (ATA 42) and each ATA being in charge of authorizing execution of elementary system tests. Furthermore, this embodiment permits dynamic management of input/output interface tests.

A third embodiment, derived from the second embodiment described in the foregoing, consists in pre-loading the libraries corresponding to the elementary system tests into the module to be tested, so that they can be executed as a module interface test, or in other words without interacting with the applications that furnished the libraries. Thus, when a module interface test is requested, the module being tested launches all of the libraries concerning the input/output interfaces to be tested. The libraries are directly implemented in the module, thus avoiding all problems of communication between the module to be tested and the applications. These libraries were created beforehand by the ATA XXs and loaded into the modules in a dedicated table.

Figure 7:
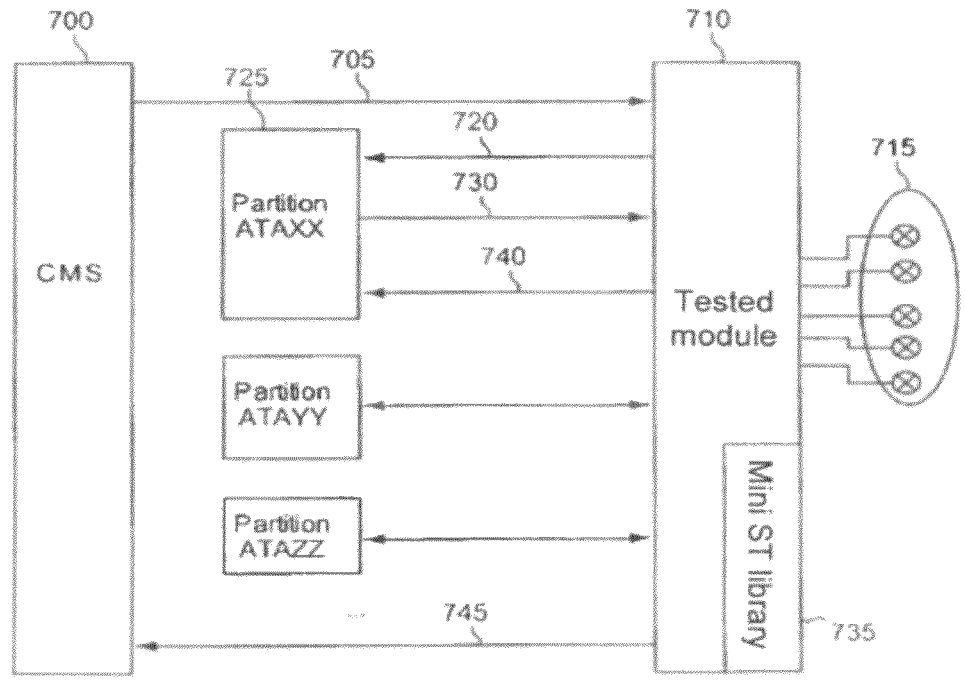

This embodiment is illustrated in FIG. 7.

Once again, when an aircraft is on the ground, a maintenance operator may launch a module test from a maintenance computer such as CMS 700 placed in interactive mode, via an MMI of this computer (step 705). The corresponding request is transmitted to module 710 to be tested. On the basis of a configuration table, module 710 determines the input/output interfaces used by each partition, or in other words the input/output interfaces allocated to each avionic system, among all of the input/output interfaces 715 of the module.

Module 710 then sends a request, for example sequentially, to each partition to obtain authorization to test the associated input/output interfaces. Thus module 710 begins by sending a first request (step 720) to the partition associated with a first system, in this case ATA XX, denoted by 725, indicating preferably the input/output interfaces to be tested.

In response to this request, the partition returns a message authorizing the input/output interface test (step 730), or in other words a message of the OK type. Alternatively, if the input/output interfaces of first partition 725 cannot be tested, the returned message is of the NOK type. The partition may also return a message authorizing the test of only certain input/output interfaces:

If input/output interfaces of first partition 725 can be tested, the module being tested finds a library corresponding to the elementary system tests to be executed in a dedicated table, in this case denoted by 735. This library is then executed by the module being tested according to the authorizations given by the partition. As indicated in the foregoing, these elementary system tests are typically sub-tests of traditional system tests.

After the authorized elementary system tests of the first partition have been executed, the corresponding results are added to the results of the module interface test. A message indicating end of execution of the received library is then preferably transmitted to first partition 725 (step 735).

The process is then repeated for the next partitions, especially the partitions linked in this case to the systems ATA YY and ATA ZZ.

After it has launched execution of libraries corresponding to the elementary system tests associated with the partitions of the tested module, the module interface test transmits, to the CMS (step 745), its test results, comprising the test results obtained from the partitions, in other words of the elementary system tests.

This embodiment makes it possible to obtain a complete test result and to segregate the executed tasks, the tested module executing the module interface test (ATA 42) and each ATA being in charge of authorizing the execution of the elementary system tests. Furthermore, the pre-loading of libraries into the tested module reduces the problems of data communication and coherence between the system partitions of the ATA XXs and the tested module.

Although the three embodiments described in the foregoing make it possible to test input/output interfaces of a module from a maintenance computer, they do not make it possible to test initial conditions prior to execution of elementary system tests. Such initial conditions may concern especially conditions that can be verified only by an operator, for example a condition known by the expression "Warning: nobody next to steering," indicating a danger for persons situated close to movable surfaces.

Such initial conditions are typically described by means of particular tags (for example the tag <_INIT>) for each avionic system in files in the XML format, which make it possible to carry out system tests in interactive mode, or in other words triggered by a maintenance operator. These files are generally furnished by subcontractors working on the development of avionic functions and loaded into the CMS. During system tests, the CMS uses these files. If predetermined tags are identified, the corresponding pre-conditions must be verified in order to execute the tests.

A fourth embodiment makes it possible to verify such initial conditions prior to the execution of input/output interface tests in a module. According to this embodiment, the computer that permits a maintenance operator to launch maintenance procedures, for example a CMS, is used directly to launch elementary system tests.

In conformity with the logic employed in the three embodiments described in the foregoing, the test interface used here relies on a module interface test and on elementary system tests obtained from system tests. Thus the input/output interfaces of a module are tested physically and functionally by virtue of the module interface test and elementary system tests of avionic systems (ATA XX) that use the module to be tested.

FIG. 8 schematically illustrates this fourth embodiment.

When an aircraft is on the ground, a maintenance operator may launch tests from a maintenance computer such as a CMS 800 placed in interactive mode, using the MMI of this computer. In this case CMS 800 comprises an interface 805 to the avionic systems, or in other words to the partitions of modules of IMA type, as well as a memory in which there are stored, in particular, instructions 810 making it possible to command the tests to be executed by the modules, or in other words, in particular, elementary system tests.

Thus, for example, a maintenance operator is able to send a request (step 815) from CMS 800 to a first partition 820 of module 825 to be tested. In this case the request comprises instructions to execute elementary system tests loaded beforehand into first partition 820, these elementary system tests making it possible to test input/output interfaces of tested module 825, being used by first partition 820, among all of its input/output interfaces 830.

The results of execution of these elementary system tests are transmitted by first partition 820 to CMS 800 (step 835), which is then able to display them.

Similarly, the maintenance operator is able to send similar requests to the other partitions of tested module 825 in order to test other input/output interfaces of this module.

In this way, the results of execution of elementary system tests are communicated to the CMS then displayed gradually as the elementary system tests are being executed.

It is also possible to display the test results when all of the tests have been carried out. However, such a solution does not have any real advantages because, if a breakdown is detected, system-by-system detection permits better reactivity for analysis of failures.

As described in the foregoing, the interactive test scenarios may be stored in the CMS in XML format. These files may contain different commands, such as the commands START, INIT, NEXT and WAIT, which are identified by means of predetermined tags and sent to the BITE functionality of the module to be tested.

It is noted here that these files are defined by the developers of the ATA XXs by following the rules of ATA 42, because when a maintenance operator launches one of these tests, he is launching an ATA 42 test and not an ATA XX test as such. Consequently, the configuration of these XML files must take into account especially the fact that it must be possible to convert ATA XX results into ATA 42 before displaying them on the CMS.

FIG. 9 illustrates an example of a diagram of the sequence during the execution of an elementary system test necessitating verification of initial conditions, in conformity with the fourth embodiment described in the foregoing.

More precisely, FIG. 9 illustrates exchanges of messages, of requests and of results between systems 900 of an aircraft, making it possible to define a status, a maintenance operator 902, an MMI 904 of a CMS being used, an application ATA XX 906, an input/output interface 908 of a module employing this application and a sensor or an actuator 910.

After a test has been selected by a maintenance operator 902 via an MMI 904 of the CMS being used (step 912), information items relating to this selected test are preferably displayed (step 914). As described in the foregoing, the test configuration data are, for example, defined in a configuration file in XML format.

The first elementary system test of the selected test is then identified in order to be executed (reference 916). Once again, information items concerning this elementary system test are preferably displayed (step 918). A phase of initialization of this elementary system test (reference 920) is then launched. During this phase, a first step has the objective of placing the module being tested in interactive test mode (step 922).

If one or more pre-conditions are required to carry out the identified elementary system test, or in other words if the configuration file indicates such a constraint, for example by means of predetermined tags, MMI 904 indicates this to maintenance operator 902 (step 924). Depending on the nature of the pre-conditions, these are or are not validated (steps 926 and 928) by the maintenance operator on the basis of visual analysis, for example if they concern the absence of persons in the proximity of movable surfaces, or by interrogation of a system of the aircraft, for example if they concern the stopped or off state of a computer. The validation (or invalidation) is transmitted by maintenance operator 902 to MMI 904 (step 930).

If the pre-conditions are not valid, the execution of the identified elementary system test is ended and, as the case may be, the next elementary system test is identified to be processed in the same way.

The next elementary system test may pertain to an input/output interface different from that tested previously, associated with the same avionic system (same ATA XX), or a different input/output interface of a different avionic system.

If, on the other hand, the pre-conditions are valid, the elementary system test is executed. For these purposes, stimuli are generated by application 906 to be tested and are transmitted to input/output interface 908 of the module being tested (step 932). In parallel, application 906 is placed in a fault monitoring and detection mode (step 934).

The stimuli transmitted to input/output interface 908 of the module being tested are then retransmitted, in the form of commands, to an actuator or sensor 910 (step 936), which executes the received command or commands (step 938) and returns a result to input/output interface 908 of the module being tested, which itself retransmits it to application 906, which in turn retransmits it to MMI 904 (steps 940, 942 and 944), which is then able to display the result of execution of the identified elementary system test (step 946).

The next elementary system test is then identified, as the case may be, to be processed in the same way.

Once again, the next elementary system test may pertain to an input/output interface different from that tested previously, associated with the same avionic system (same ATA XX), or a different input/output interface of a different avionic system.

Such an embodiment permits an exhaustive test of the input/output interfaces considered to be critical in a module, without impact for the function that hosts the applications of the ATA XXs (ATA 42), and taking the initial conditions into account. In addition, such an embodiment does not require an additional calculation resource at the module being tested and requires only little resource at the central computer for management of maintenance messages (the CMS in this case).

Estimates have shown that the ratio of time saving of elementary system tests compared with system tests was on the order of five.

Regardless of the embodiment, if elementary system tests do not reveal a fault, the input/output interfaces tested may be considered as functioning normally. In contrast, if a fault is detected, the input/output interface under consideration of the module is faulty (and therefore an ATA 42 fault is present) and/or an equipment item connected to this input/output interface is defective (which corresponds to a fault of the corresponding avionic system, ATA XX fault).

Depending on the case, the responsibilities are not the same, because in the presence of a fault of an avionic system, the maintenance operator has revealed a hidden breakdown that was probably present before replacement of the ATA 42 module but is not his responsibility. It must be corrected by a maintenance operator of the suspect avionic system.

Consequently, during the procedure of replacement of an ATA 42 module, it could be advisable to carry out elementary system tests two times, one time before the change and one time after the installation of the new module, in order to identify the origin of the breakdown of the avionic system, or in other words to determine whether or not it was introduced by the maintenance operator.

In this way, not only does the invention make it possible to improve the tests carried out in connection with a changed module, but it also makes it possible to diagnose hidden breakdowns that could have impacts on safety. Consequently, this also brings about better functional diagnosis of the modules being employed.

FIG. 10 illustrates an exemplary hardware architecture of an IMA—type module, adapted for implementing certain steps of the invention. Device 1000 here comprises a communication bus 1005 to which there are connected:
- one or more central processing units or microprocessors 1010 (CPU);
- a read-only memory 1015 (ROM, acronym for Read Only Memory in English terminology) able to comprise programs (prog, prog1 and prog2) necessary for implementation of the invention;
- a random-access memory or cache memory 1020 (RAM, acronym for Random Access Memory in English terminology) comprising registers adapted for recording variables and parameters created and modified in the course of running of the aforesaid programs; and
- a communication interface 1050 adapted for transmitting and receiving data.

Device 1000 also preferably has the following elements: a hard disk 1035 able to comprise the aforesaid programs as well as information items processed or to be processed according to the invention and a memory-card reader 1040 adapted for receiving a memory card 1045 and reading or writing therein data processed or to be processed according to the invention.

The communication bus permits communication and interoperability among the different elements included in device 1000 or connected thereto. The depiction of the bus is not limitative and, in particular, the central unit is capable of communicating instructions to any element of device 1000 directly or via another element of device 1000.

The executable code of each program allowing the programmable device to implement the processes according to the invention can be stored, for example, on hard disk 1035 or in read-only memory 1015.

According to one variant, memory card 1045 can contain information items, in particular information items to be processed according to the invention, as well as the executable code of the aforesaid programs which, once read by device 1000, is stored on hard disk 1035.

According to another variant, the executable code of the programs and the information items to be processed according to the invention will be able to be received, at least partially, via interface 1050, to be stored in a manner identical to that described above.

More generally, the program or programs as well as the information items to be processed according to the invention will be able to be loaded into one of the storage means of device 1000 before being run.

Central unit 1010 is going to control and direct the execution of the instructions or portions of software code of the program or programs according to the invention, which instructions are stored on hard disk 1035 or in read-only memory 1015 or else in the other aforesaid storage elements. During boot-up, the program or programs that are stored in a non-volatile memory, for example hard disk 1035 or read-only memory 1015, are transferred to random-access memory 1020 which then contains the executable code of the program or programs according to the invention, as well as registers for storing the variables and parameters necessary for implementation of the invention.

The architecture of the device illustrated on FIG. 10 also may be used in a maintenance computer allowing a maintenance operator to launch interactive tests in an IMA-type module. Nevertheless, the device furthermore preferably has one or more display units making it possible to display data and able to serve as a graphical interface with a user who will be able to interact with programs according to the invention, with the aid of a keyboard and a mouse or another pointing device such as a touch screen or a remote control.

Naturally, to satisfy specific needs, an individual competent in the field of the invention will be able to apply modifications in the foregoing description.

The invention claimed is:

1. A method comprising:
testing at least one input/output interface of a computer module of IMA type comprising a plurality of input/output interfaces, in a device comprising a plurality of computer modules of IMA type, of at least one system comprising at least one application employed by a set of computer modules of the plurality of computer modules, the set of computer modules comprising the computer module having the at least one input/output interface, referred to as a first computer module, and at least one other computer module, referred to as at least one second computer module, at least one system test being associated with the at least one system for functionally testing the set of computer modules according to the at least one system, the at least one system test comprising at least one elementary system test for functionally testing the at least one input/output interface of the first computer module, said testing including:
executing, using a processor, the at least one elementary system test to functionally test the at least one input/output interface of the first computer module, said executing the at least one elementary system test being performed without functionally testing the at least one second computer module, and transmitting, using the processor, at least one result of execution of the at least one elementary system test to a maintenance computer distinct from the computer modules of the plurality of computer modules.

2. The method according to claim 1, further comprising executing, using the processor, at least one second elementary system test distinct from the at least one elementary system test, referred to as a first elementary system test, the at least one second elementary system test being to test at least one second input/output interface of the first computer module, distinct from the at least one input/output interface, referred to as at least one first interface, the at least one second elementary system test belonging to a second system test distinct from the at least one system test, referred to as at least one first system test, the second system test being associated with a second system comprising at least one application, distinct from the at least one system, referred to as at least one first system, the second system being employed by a second set of computer modules, distinct from the set of computer modules, referred to as a first set of computer modules, comprising at least the first computer module and at least one other computer module of the plurality of computer modules, the second system test being to test the second set of computer modules functionally according to the second system, said executing the at least one second elementary system test functionally testing the at least one second input/output interface of the first computer module without functionally testing at least one other computer module of the second set of computer modules,
transmitting at least one result of execution of the second elementary system test to the maintenance computer.

3. The method according to claim 1, further comprising performing, using the processor, logical testing of an interface of at least one input/output interface of the first computer module, said executing the at least one elementary system test being called by said performing logical testing.

4. The method according to claim 1, further comprising authorizing execution of the at least one elementary system test according to the at least one system, the at least one elementary system test being executed in response to said authorizing.

5. The method according to claim 1, further comprising initializing the at least one elementary system test, said initializing being executed in response to an operator command acquired via the maintenance computer.

6. The method according to claim 1, further comprising, prior to said executing the at least one elementary system test, breaking the at least one system test down into a plurality of elementary tests, the plurality of elementary tests comprising the at least one elementary system test.

7. The method according to claim 1, further comprising executing a module interface test to verify testable input/output interfaces of the first computer module,
wherein said executing the module interface test does not verify testable input/output interfaces of any of the other computer modules of the set of computer modules, and
wherein said executing the module interface test to verify testable input/output interfaces of the first computer module is performed prior to said executing the at least one elementary system test to functionally test the at least one input/output interface of the first computer module.

8. The method according to claim 2, wherein said executing the at least one second elementary system test is called after said executing the first elementary system test.

9. The method according to claim 4, wherein the at least one elementary system test is executed in an environment specific to the at least one system.

10. The method according to claim 5, further comprising verifying at least one initial condition, said executing the at least one elementary system test being executed in response to said verifying the at least one initial condition.

11. A non-transitory computer-readable storage medium storing computer-readable instructions that, when executed by a computer, cause the computer to perform a method comprising:
testing at least one input/output interface of a computer module of IMA type comprising a plurality of input/output interfaces, in a device comprising a plurality of computer modules of IMA type, of at least one system comprising at least one application employed by a set of computer modules of the plurality of computer modules, the set of computer modules comprising the computer module having the at least one input/output interface, referred to as a first computer module, and at least one other computer module, referred to as at least one second computer module, at least one system test being associated with the at least one system for functionally testing the set of computer modules according to the at least one system, the at least one system test comprising at least one elementary system test for functionally testing the at least one input/output interface of the first computer module, said testing including:
executing the at least one elementary system test to functionally test the at least one input/output interface of the first computer module, said executing the at least one elementary system test being performed without functionally testing the at least one second computer module, and
transmitting at least one result of execution of the at least one elementary system test to a maintenance computer distinct from the computer modules of the plurality of computer modules.

12. A device comprising:
circuitry configured to test at least one input/output interface of a computer module of IMA type comprising a plurality of input/output interfaces, in a device comprising a plurality of computer modules of IMA type, of at least one system comprising at least one application employed by a set of computer modules of the plurality of computer modules, the set of computer modules comprising the computer module having the at least one input/output interface, referred to as a first computer module, and at least one other computer module, referred to as at least one second computer module, at least one system test being associated with the at least one system for functionally testing the set of computer modules according to the at least one system, the at least one system test comprising at least one elementary system test for functionally testing the at least one input/output interface of the first computer module, the testing by the circuitry including:
executing the at least one elementary system test to functionally test the at least one input/output interface of the first computer module, the executing of the at least one elementary system test being performed without functionally testing the at least one second computer module, and
transmitting at least one result of execution of the at least one elementary system test to a maintenance computer distinct from the computer modules of the plurality of computer modules.

13. An aircraft comprising the device according to claim 12.

* * * * *